(12) United States Patent
Shaarabany

(10) Patent No.: US 12,508,530 B2
(45) Date of Patent: Dec. 30, 2025

(54) MECHANICAL ELECTROSTATIC FILTER ASSEMBLY

(71) Applicant: Effy Shaarabany, Ramat-Gan (IL)

(72) Inventor: Effy Shaarabany, Ramat-Gan (IL)

( * ) Notice: Subject to any disclaimer, the term of this patent is extended or adjusted under 35 U.S.C. 154(b) by 439 days.

(21) Appl. No.: 17/926,725

(22) PCT Filed: May 27, 2021

(86) PCT No.: PCT/IL2021/050628
§ 371 (c)(1),
(2) Date: Nov. 21, 2022

(87) PCT Pub. No.: WO2021/240527
PCT Pub. Date: Dec. 2, 2021

(65) Prior Publication Data
US 2023/0201753 A1 Jun. 29, 2023

Related U.S. Application Data

(60) Provisional application No. 63/030,329, filed on May 27, 2020.

(51) Int. Cl.
*B01D 46/00* (2022.01)
*B01D 39/08* (2006.01)
(Continued)

(52) U.S. Cl.
CPC ....... *B01D 46/0032* (2013.01); *B01D 39/083* (2013.01); *B01D 39/10* (2013.01);
(Continued)

(58) Field of Classification Search
CPC .... B01D 46/10; B01D 46/0032; B01D 46/62; B01D 46/79; B01D 46/0005; B01D 39/10; B01D 39/12
See application file for complete search history.

(56) References Cited

U.S. PATENT DOCUMENTS 2,864,460 A 12/1958 Powers
3,830,045 A * 8/1974 Copenhefer ........... B01D 46/10
55/501
(Continued)

FOREIGN PATENT DOCUMENTS

CN 102489404 A 6/2012
EP 0983120 A1 3/2000
(Continued)

OTHER PUBLICATIONS

PCT International Search Report for International Application No. PCT/IL2021/050628, mailed Aug. 19, 2021, 4pp.
(Continued)

*Primary Examiner* — Robert Clemente
(74) *Attorney, Agent, or Firm* — The Roy Gross Law Firm, LLC; Roy D. Gross

(57) ABSTRACT

An improved mechanical electrostatic filter assembly for filtering an air stream from particulates, comprising either a single cartridge or multiple cartridges positioned in a consecutive manner, either close together or separated from one another via air gaps, each of the multiple cartridges comprising inner filtering media, each of the multiple cartridges having a back wall and a front wall, each of the back wall and each of the front wall having multiple openings through which the air stream is passing.

As the air stream with particulates approaching the improved mechanical electrostatic filter assembly, and hitting an outer surface of the front wall of a first cartridge, friction is established and the particulates get electrostatically charged, wherein the air stream with the electrostatically charged particulates passing through the multiple openings of the front wall and the electrostatically charged particulates are electrically coupled to the inner filtering media, the air stream exiting the first cartridge can pass (Continued)

through at least one additional cartridge for filtering the particulates remained in the air stream.

12 Claims, 5 Drawing Sheets

(51) Int. Cl.
  *B01D 39/10* (2006.01)
  *B01D 46/12* (2022.01)
  *B01D 46/58* (2022.01)
  *B01D 46/62* (2022.01)
  *B01D 46/79* (2022.01)
(52) U.S. Cl.
  CPC ......... *B01D 46/0005* (2013.01); *B01D 46/12* (2013.01); *B01D 46/58* (2022.01); *B01D 46/62* (2022.01); *B01D 46/79* (2022.01)

(56) References Cited

U.S. PATENT DOCUMENTS

| | | | |
|---|---|---|---|
| 4,099,944 A * | 7/1978 | Davis | B01D 46/10 55/501 |
| 4,115,082 A | 9/1978 | Newell | |
| 4,902,306 A | 2/1990 | Burnett et al. | |
| 5,037,455 A | 8/1991 | Scheineson et al. | |
| 5,336,299 A | 8/1994 | Savell | |
| 5,525,136 A | 6/1996 | Rosen | |
| 5,525,145 A * | 6/1996 | Hodge | B01D 46/10 55/516 |
| 5,989,303 A * | 11/1999 | Hodge | B01D 46/0032 55/497 |
| 5,989,320 A * | 11/1999 | Rutkowski | B01D 46/10 55/528 |
| 8,062,403 B2 | 11/2011 | Goode | |
| 2007/0137480 A1 | 6/2007 | Bergeron et al. | |
| 2018/0361295 A1* | 12/2018 | Legare | B01D 46/0005 |

FOREIGN PATENT DOCUMENTS

| | | |
|---|---|---|
| EP | 2040845 A1 | 4/2009 |
| JP | 2017504464 A * | 2/2017 |

OTHER PUBLICATIONS

PCT Written Opinion for International Application No. PCT/IL2021/050628, mailed Aug. 19, 2021, 5pp.
PCT International Preliminary Report on Patentability for International Application No. PCT/IL2021/050628, issued Nov. 17, 2022, 6pp.
European Patent Office, Supplementary European Search Report for European Patent Application No. 21813478, dated Oct. 31, 2023, 14pp.

* cited by examiner

MECHANICAL ELECTROSTATIC FILTER ASSEMBLY

CROSS REFERENCE TO RELATED APPLICATIONS

This application is a National Phase of PCT Patent Application No. PCT/IL2021/050628 having International filing date of May 27, 2021, which claims the benefit of priority of U.S. Provisional Patent Application No. 63/030,329, filed May 27, 2020, the contents of which are all incorporated herein by reference in their entirety.

FIELD OF THE INVENTION

The present invention relates generally to filters for separating particulates from air. More specifically, the present invention relates to high efficiency indoor environment air flows filter devices.

BACKGROUND

Along with the raising of people's living standard, with the development of industry and with the increase in the number of automobiles, a large quantity of polluted air is generated continuously, and such pollution becomes a root of endangering human health in real life. While outdoor air pollution is rendered by various sources such as coal smoke and automobile pollution, indoor air pollution is even more serious, since the space is relative narrow and small, and ventilation condition is limited. Thus, pollutants such as dust, pollen, medicated cigarette Mist, exhaled gas and the like are concentrated and thus damage the healthy and quality of people's life.

Therefore, due to the continuous decline of air quality in indoor as well as outdoor environments and the demand of people to filter some or all of the contaminant material from the air stream, various air purifiers have been developed over the years some of which are described as follows:

U.S. Pat. No. 5,336,299 describes multi-layered electrostatic filter and method of filtration incorporating an insulated poly glass charging element which is a grid of sufficient width to allow the air flow through the charging element to supply a static charge to the charging element and to allow trapped particles to gather and combine or coagulate along the charged element prior to reaching a dust trap which is a second layer of polypropylene filters.

U.S. Pat. No. 8,062,403 describes an improvement to a reusable filtering assembly used in circulating air systems for residential or commercial heating and air conditioning systems. A series of layers consisting of filtering materials disposed between two framing units are comprised of the following: expanded metal lath, a layer of small fiber material, a layer of large fiber material, a layer of small crimp wire cloth, a layer of small fiber material, and a last layer of expanded metal lath.

U.S. Pat. No. 4,902,306 describes a filter assembly for removing particulate matter from air forced therethrough. The filter comprises two pairs of oppositely charged woven electrostatic filtering material.

U.S. Pat. No. 5,525,136 describes an air cleaner incorporating a plurality of filtration techniques within a rigid, gasketed frame designed to fit in conventional filter tracks. A perimeter gasket attached to the frame leaving air side provides a positive seal thereby preventing air from bypassing the frame. The frame houses, in series from the entering air side, a replaceable dry-type media filter coated on its leaving air side with a viscous substance, and a synthetic weave having a charge separation producing local electrostatic effects.

CN102489404 provides an electret polypropylene thermoplastic bar electrostatic precipitation filter, which comprises a frame and a metal grid protecting layer, a grid positive and negative polypropylene thermoplastic bar electrostatic generator, a polyurethane foamed plastic layer, another grid positive and negative polypropylene thermoplastic bar electrostatic generator and another metal grid protecting layer which are arranged in the frame sequentially, wherein the polyurethane foamed plastic layers have negative electrostatic property and are provided with holes. The filter is capable of purifying suspension particles and dust in air without generation of ozone or other secondary harmful pollutants.

As noted above, various air filters have been developed over the years, however, there is still a need for an improved air filtration device of relatively low cost and high efficiency. Thus, it is an aim of the present invention to provide an improved air filter device characterized by a simplified design, easy and comfortable to operate and provides noticeable high filtering capabilities.

SUMMARY OF THE INVENTION

The improved mechanical electrostatic filter assembly of the present invention is intended fix use in both indoor and outdoor spaces. More specifically, the improved mechanical electrostatic filter assembly of the present invention may be used to sterilize incoming and circulating air in rooms, halls, as well as in various confined spaces, such as, in busses, trains and hospital wards. It may also be used to filter and purify outcoming air originated via kitchens stoves, fryers and factory polluting halls/machines, and it may also be used in outdoor areas such as hospital outer areas and the like.

Thus, in accordance with some embodiments of the present invention, there is thus provided an improved mechanical electrostatic filter assembly for filtering an air stream from particulates, comprising either a single cartridge or multiple cartridges positioned in a consecutive manner, close together, each of said multiple cartridges comprising inner filtering media, each of said multiple cartridges having a back wall and a front wall, each of said back wall and each of said front wall having multiple openings through which said air stream is passing, wherein as said air stream with particulates approaching the improved mechanical electrostatic filter assembly, and hitting an outer surface of said front wall of a first cartridge, friction is established and the particulates get electrostatically charged, wherein the air stream with said electrostatically charged particulates passing through said multiple openings of said front wall and the electrostatically charged particulates are electrically coupled to said inner filtering media, the air stream exiting said first cartridge passing through at least one additional cartridge for filtering the particulates remained in said air stream, thereby, said improved mechanical electrostatic filter assembly is filtering said air stream from particulates.

Furthermore, in accordance with some embodiments of the present invention, there is provided an improved mechanical electrostatic filter assembly for filtering an air stream from particulates, comprising either a single cartridge or multiple cartridges positioned in a consecutive manner, separated from one another via air gaps, said single cartridge or each of said multiple cartridges comprising inner filtering media, said single cartridge or each of said multiple cartridges having a back wall and a front wall, each of said back wall and each of said front wall having multiple openings through which said air stream is passing, wherein as said air stream with particulates approaching the improved mechanical electrostatic filter assembly, and hitting an outer surface of said front wall of a first cartridge, friction is established and the particulates get electrostatically charged, wherein the air stream with said electrostatically charged particulates passing through said multiple openings of said front wall, and the electrostatically charged particulates are electrically coupled to said inner filtering media, the air stream exiting said first cartridge passing through at least one additional cartridge for filtering the particulates remained in said air stream, wherein said air gaps building up/increasing the electrostatic charge in the particulates in said air stream flowing through the consecutive cartridges, and thus, improving the filtration capabilities of the improved multi-layered electrostatic filter, thereby, said improved mechanical electrostatic filter assembly is filtering said air stream from particulates.

Furthermore, in accordance with some embodiments of the present invention, multiple openings having rounded corners to provide an obstacle-free path for said air steam.

Furthermore, in accordance with some embodiments of the present invention, the back wall and said front wall of said single cartridge or each of said multiple cartridges having a thickness ranging from 1 to 8 millimeters for enhancing/amplifying an electrostatic charge in said particulates.

Furthermore, in accordance with some embodiments of the present invention, the single cartridge or multiple cartridges are made of materials capable of being charged electrostatically and thus electrostatically charging said particulates in said air stream.

Furthermore, in accordance with some embodiments of the present invention, the materials are selected from hard polymers and hard polymer mixtures.

Furthermore, in accordance with some embodiments of the present invention, the inner filtering media is a wire grid/mesh.

Furthermore, in accordance with some embodiments of the present invention, the inner filtering media is selected from a bulk of wires, threads, strips, fibers or combinations thereof.

Furthermore, in accordance with some embodiments of the present invention, the inner filtering media is made of a polymeric material, a single polymer/a mixture of polymers, wool, cotton or a combination thereof.

Furthermore, in accordance with some embodiments of the present invention, said air gap having a width ranging from 2 to 5 millimeters, said width is suitable for building up/increasing the electrostatic charge in the particulates in said air stream as said air stream is recharged electrostatically while passing through said air gaps.

Furthermore, in accordance with some embodiments of the present invention, said improved mechanical electrostatic filter assembly comprised of 3 of said cartridges separated from one another via said air gaps, the degree of filtration increasable by at least 30%.

Furthermore, in accordance with some embodiments of the present invention, the improved mechanical electrostatic filter assembly further comprising an internal/external air blower disposed in front of/behind said improved mechanical electrostatic filter assembly for pushing/pulling air in/out of said improved mechanical electrostatic filter assembly.

Furthermore, in accordance with some embodiments of the present invention, the improved mechanical electrostatic filter assembly further comprising an opening for forcing water therethrough for cleaning the inner filtering media.

Furthermore, in accordance with some embodiments of the present invention, the width of each of said cartridges is as high as about 10 centimeters.

BRIEF DESCRIPTION OF THE INVENTION

FIG. 1 is a perspective view of the improved multi-layered electrostatic filter assembly in accordance with some embodiments of the present invention.

FIGS. 2A&B are perspective views of cartridges having a cut-away portion exposing the inner filtering media.

DETAILED DESCRIPTION OF THE FIGURES

Figure 1:
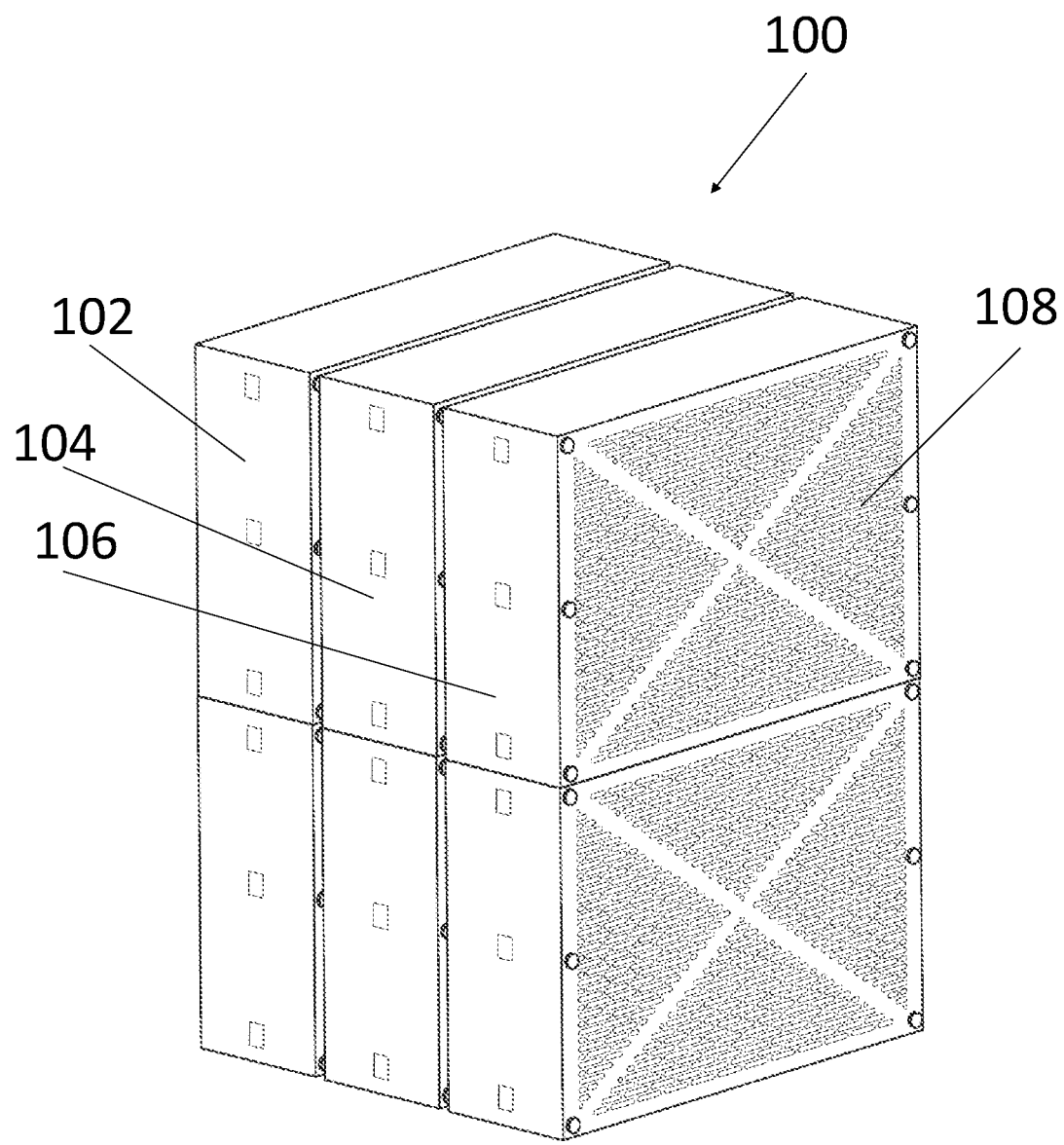

FIG. 1 is a perspective view of an improved mechanical electrostatic filter assembly 100 in accordance with some embodiments of the present invention.

In accordance with some embodiments of the present invention, the improved mechanical electrostatic filter assembly comprises either a single cartridge or multiple cartridges depending on the desired filtration level—the filtering level increases as the number of cartridges increase. As seen in the figure, the improved mechanical electrostatic filter assembly 100 is comprised of cartridge 102, cartridge 104, and cartridge 106 positioned in a consecutive manner, close together, wherein each cartridge 102, 104, 106 containing an inner filtering media (not seen in the figure).

In accordance with some embodiments of the present invention, each of cartridges 102, 104, 106 has two walls, a back wall and a front wall, such as front wall 108 of cartridge 106 with multiple openings through which an air stream passes. As seen in the figure, the openings are designed to have rounded corners to allow an obstacle-free path for the air steam, as opposed to unrounded corners, such rounded cornered-openings do not hinder the air flow.

In accordance with some embodiments of the present invention, cartridges 102, 104, 106 are designed to enhance/amplify the electrostatic charge in the air stream significantly. As the air stream with particulates approaching the improved mechanical electrostatic filter assembly 100, and hitting an outer surface of the front wall of a first cartridge, for instance, front wall 108 of cartridge 106, friction is established and the particulates get electrostatically charged.

In accordance with some embodiments of the present invention, the walls of cartridges 102, 104, 106 are designed to have a preferable thickness, for instance, a wall thickness ranging from 1 to 8 millimeters, which enhances/amplifies the electrostatic charge in air molecules and in particulate matter flowing therethrough.

In accordance with some embodiments of the present invention, the width of the cartridges 102, 104, 106 may be up to about 10 centimeters and preferably about 5 centimeters. In accordance with some embodiments of the present invention, cartridges wider than about 10 centimeters may not be effective as the air stream may lose some or all of the electrostatic charge while passing therethrough.

In accordance with some embodiments of the present invention, the cartridges 102, 104, 106 may be made of materials capable of being charged electrostatically, and thus, may develop an electrostatic charge in air molecules and in particulate matter flowing therethrough.

Thus, in accordance with some embodiments of the present invention, in order to enhance/amplify the electrostatic charge in the particulates, the cartridge walls may (a) be made of selected hard polymer(s)/hard polymer mixture(s) such as for instance polypropylene, polyethylene and the like having a strong negative charge and thus enhance/amplify the negative charge in the air passing therethrough, (b) have an optimized thickness ranging from 1 to 8 millimeters for establishing a friction action between the cartridge walls and the air passing therethrough and developing a negative electrostatic charge in the particulates within the air, and (c) have multiple openings characterized by rounded corners for not disturbing the air flow rate.

Figure 2A:
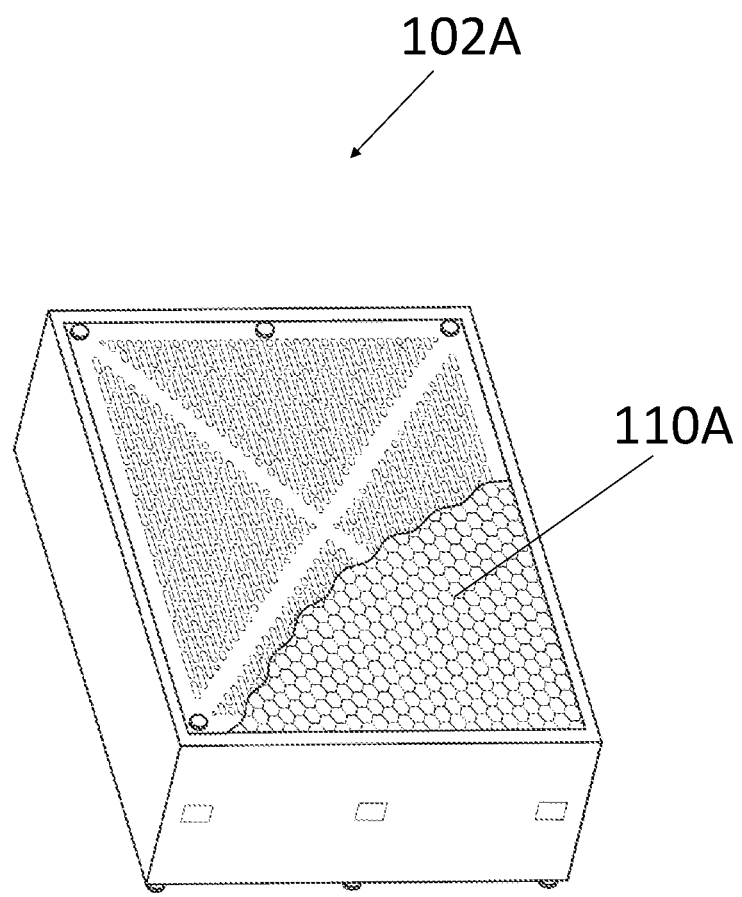
Figure 2B:
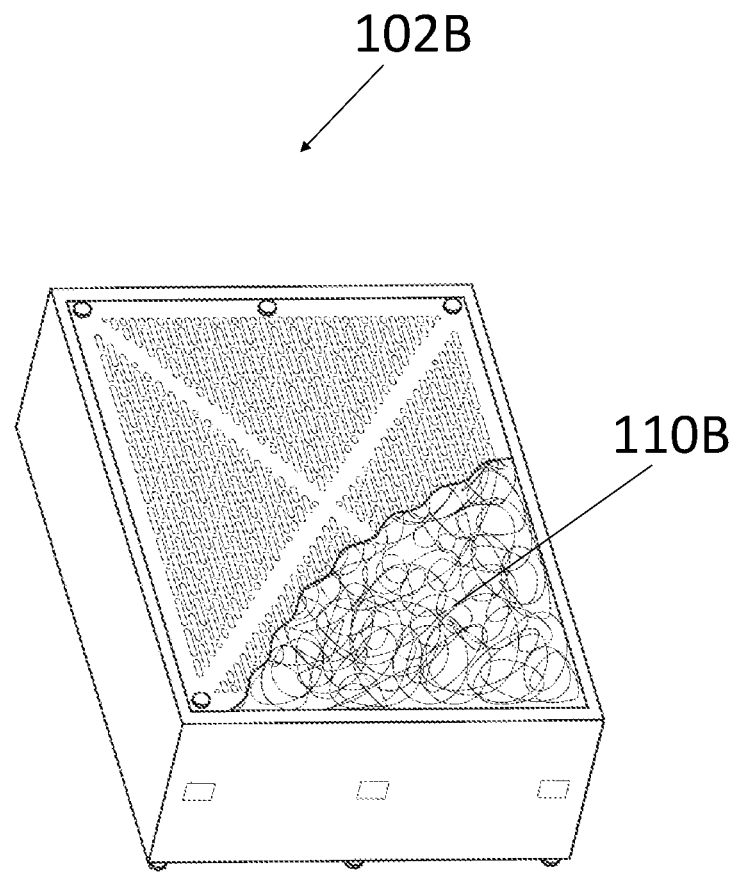

FIGS. 2A&B are perspective views of cartridge 102A&B having a cut-away portion exposing the inner filtering media 110A&B.

In accordance with some embodiments of the present invention, the inner filtering media. 110A&B may be a wire grid/mesh as seen in FIG. 2A or a bulk of wires, threads, strips, fibers or combinations thereof as seen in 2B.

The inner filtering media 110A&B may be made of a positive electrostatic material. In accordance with some embodiments of the present invention, the inner filtering media 110A&B may be made of a polymeric material, a single polymer/a mixture of polymers having a positive electrostatic charge, wool, cotton or a combination thereof.

In accordance with the present invention, as an air stream with particulates approaching the improved mechanical electrostatic filter 100, it hits the outer surface of the first cartridge 102. As the air stream hits the outer surface of the first cartridge 102, friction is established and as a result of which the air molecules and the particulates are electrostatically charged, e.g., negatively charged.

The negatively charged air molecules and particulates proceed towards the inner filtering media 110 where the negatively charged particulates are electrostatically attracted to and thus are electrically coupled to the positively charged inner filtering media 110.

Such process is repeated as the air stream proceeding and hitting the outer surface of the second cartridge 104, third cartridge 106 and so on. Thus, the air stream exiting the first cartridge 104 is a filtered air stream relatively free of particulates, such air stream passes through subsequent cartridges to repeat the filtration process, and thus, to further decrease the number of particulates in the air stream. Thus, by passing an air stream consecutively through multiple cartridges, the level of filtration is intensified and optimized.

Figure 3:
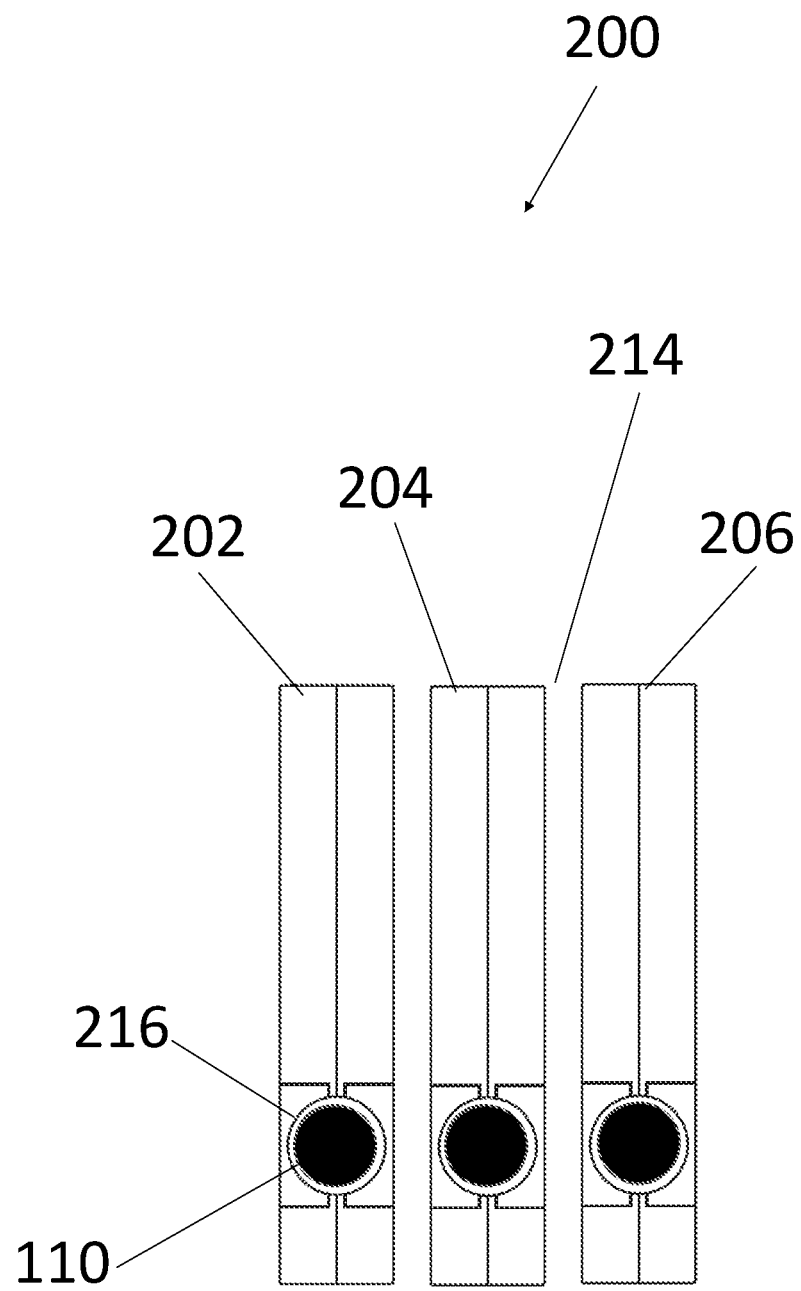
FIG. 3 illustrates a further improved multi-layered electrostatic filter assembly in accordance with some embodiments of the present invention.

FIG. 3 illustrates a further improved mechanical electrostatic filter assembly 200 in accordance with some embodiments of the present invention, the improved mechanical electrostatic filter assembly 200 is comprised of multiple cartridges, cartridges 202-206, filled with an inner filtering media and positioned in consecutive manner separated from one another via air gaps, such as air gap 214. Such gaps may have a predefined width, such as, for instance, a width ranging from 2 to 5 millimeters suitable for building up/increasing the electrostatic charge in the air molecules and in the particulates in the air flowing through the consecutive cartridges, and thus, improving the capabilities of the improved mechanical electrostatic filter assembly 200 in filtering out the remaining particulates.

Thus, in accordance with some embodiments of the present invention, the air stream passing through the air gaps, such as air gap 214, in between the cartridges is re-charged electrostatically. This improves the capabilities of the mechanical electrostatic filter assembly 200 in filtering out most of the polluted particles.

Thus, in accordance with some embodiments of the present invention, in case of the improved mechanical electrostatic filter assembly 200 comprised of 3 cartridges adjacently positioned in a tight manner, i.e., close together, the level of filtration may be such that about 50% of the mass of the particulate matter may be removed. However, if the 3 cartridges may be separated from one another via an air gap of a few millimeters, such as air gap 214, for instance, an air gap of 2-4 millimeters, the air stream may rebuild its electrostatic charge while passing through each of the air gaps leading to a radical increase in the degree of filtration, i.e., about 90% of the mass of the particulate matter may be removed.

In accordance with some embodiments of the present invention, the air flow rate into the improved mechanical electrostatic filter assembly 100, 200 may be set by a blower used for flowing air into the improved mechanical electrostatic filter assembly 100. 200. The blower may be disposed either in front of or behind the improved mechanical electrostatic filter assembly 100, 200 adjacent to the air inlet as seen in FIG. 4 or to the air outlet respectively.

In accordance with some embodiments of the present invention, the improved mechanical electrostatic filter assembly 100, 200 can be easily and inexpensively assembled and disassembled. Also, cleaning is accomplished merely by forcing water through an opening, such as opening 216 in cartridge 202 illustrated in FIG. 3 and through the inner filtering media 110 using an ordinary water hose.

Figure 4:
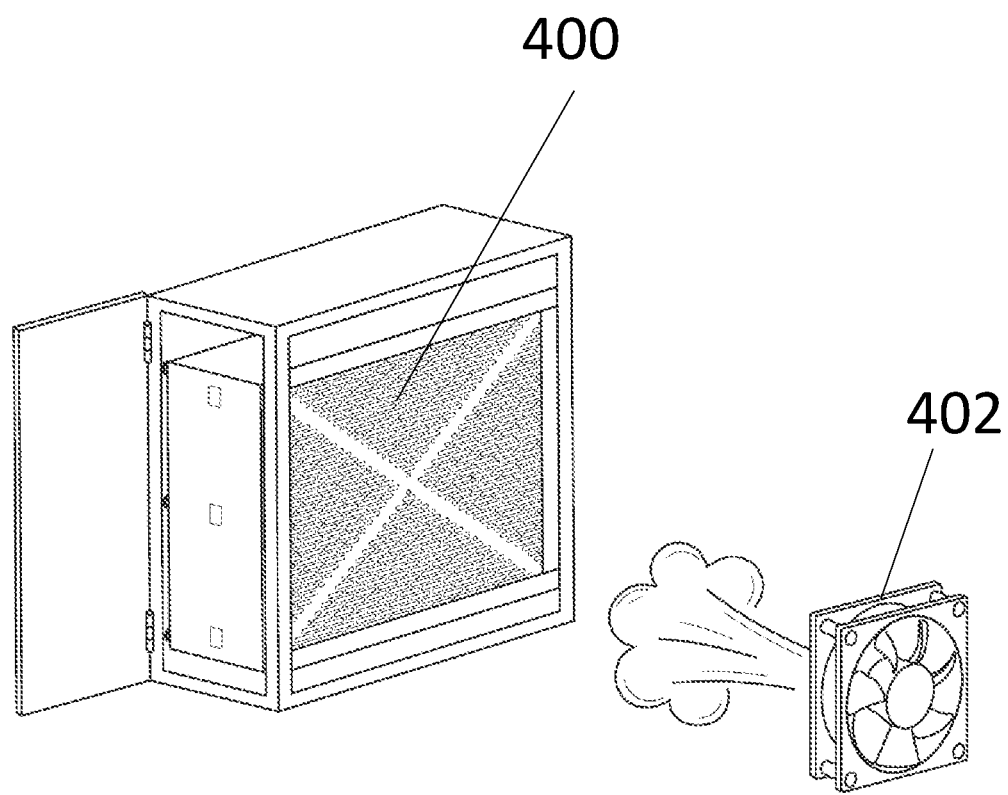
FIG. 4 illustrates a blower disposed in front of the multi-layered electrostatic filter assembly in accordance with some embodiments of the present invention.

All filter elements are extremely durable and will therefore require no maintenance by the user other than routine cleaning FIG. 4 illustrates a blower 402 disposed in front of the improved mechanical electrostatic filter assembly 400 in accordance with some embodiments of the present invention.

In accordance with some embodiments of the present invention, blower 402 may be disposed either in front of or behind the improved mechanical electrostatic filter assembly 400.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

The invention claimed is:

1. An improved mechanical electrostatic filter assembly for filtering an air stream from particulates, comprising multiple cartridges positioned in a consecutive manner, close together, each of said multiple cartridges comprising inner filtering media, each of said multiple cartridges having a back wall and a front wall, each one of said back wall and each one of said front wall having multiple openings through which said air stream is passing, wherein as said air stream with particulates approaching the improved mechanical electrostatic filter assembly, and hitting an outer surface of said front wall of a first cartridge, friction is established and the particulates get electrostatically charged, wherein the air stream with said electrostatically charged particulates passing through said multiple openings of said front wall and the electrostatically charged particulates are electrically coupled to said inner filtering media, the air stream exiting said first cartridge passing through at least one additional cartridge for filtering the particulates remained in said air stream, wherein said multiple cartridges are positioned in a consecutive manner separated from one another via an air gap, said air gap having a predefined width for building up/increasing electrostatic charge in the air molecules and in the particulates in the air stream flowing through said air gap prior to reaching the consecutive cartridge, said increased electrostatic charge in the air molecules and in the particulates improves the filtering of said air stream from particulates.

2. An improved mechanical electrostatic filter assembly of claim 1, wherein said air gap having a predefined width ranging from 2 to 5 millimeters to build up/increase the electrostatic charge in the air molecules, thus, to increase the degree of filtration by at least 30%.

3. The improved mechanical electrostatic filter assembly of claim 1, wherein said multiple openings having rounded corners to provide an obstacle-free path for said air steam.

4. The improved mechanical electrostatic filter assembly of claim 1, wherein said back wall and said front wall of each one of said multiple cartridges having a thickness ranging from 1 to 8 millimeters for enhancing/amplifying an electrostatic charge in said particulates.

5. The improved mechanical electrostatic filter assembly of claim 1, wherein said single cartridge or multiple cartridges are made of materials capable of being charged electrostatically and thus electrostatically charging said particulates in said air stream.

6. The improved mechanical electrostatic filter assembly of claim 5, wherein said materials are selected from polymers and polymer mixtures.

7. The improved mechanical electrostatic filter assembly of claim 1, wherein the inner filtering media is a wire grid/mesh.

8. The improved mechanical electrostatic filter assembly of claim 1, wherein the inner filtering media is selected from a bulk of wires, threads, strips, fibers or combinations thereof.

9. The improved mechanical electrostatic filter assembly of claim 1, wherein the inner filtering media is made of a polymeric material, a single polymer/a mixture of polymers, wool, cotton or a combination thereof.

10. The improved mechanical electrostatic filter assembly of claim 1, further comprising an internal/external air blower disposed in front of/behind said improved mechanical electrostatic filter assembly for pushing/pulling air in/out of said improved mechanical electrostatic filter assembly.

11. The improved mechanical electrostatic filter assembly of claim 1 further comprising an opening for forcing water therethrough for cleaning the inner filtering media.

12. The improved mechanical electrostatic filter assembly of claim 1, wherein the width of each of said cartridges is as high as about 10 centimeters.

* * * * *